United States Patent Office 2,821,066
Patented Jan. 28, 1958

2,821,066

AIR-JACKETED ANNULAR COMBUSTION CHAMBER FOR A JET-PROPULSION ENGINE, GAS TURBINE OR THE LIKE

John Stanley Clarke, Blacko, near Nelson, and Squire Ronald Jackson and Geoffrey John Hudson, Burnley, England, assignors to Joseph Lucas (Industries) Limited, Birmingham, England Application March 25, 1954, Serial No. 418,692

1 Claim. (Cl. 60—39.69)

This invention relates to combustion chambers of the annular type, for jet propulsion engines, gas turbines or the like. The object of the invention is to provide an improved construction for ensuring uniformity of combustion of the fuel supplied by a plurality of nozzles.

A combustion chamber in accordance with the invention has its inner and outer walls constructed at least in part from transversely corrugated metal sheet such as will form an annular arrangement of intersecting cylindrical combustion zones around the burner nozzles.

Figure 1:
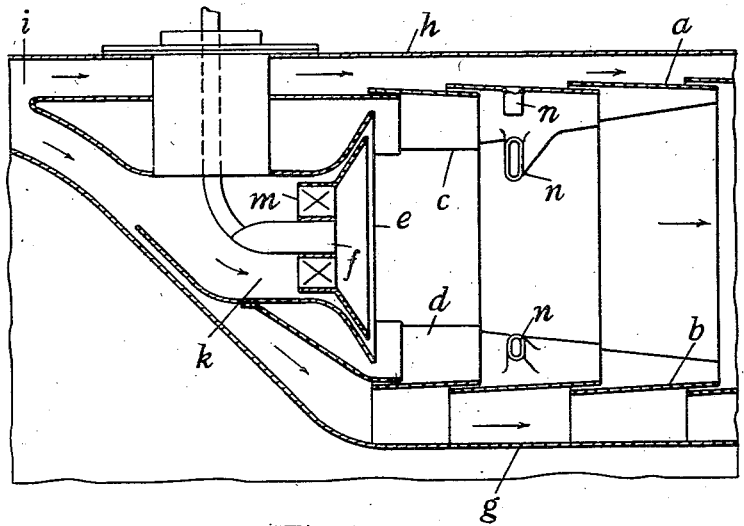
Figure 2:
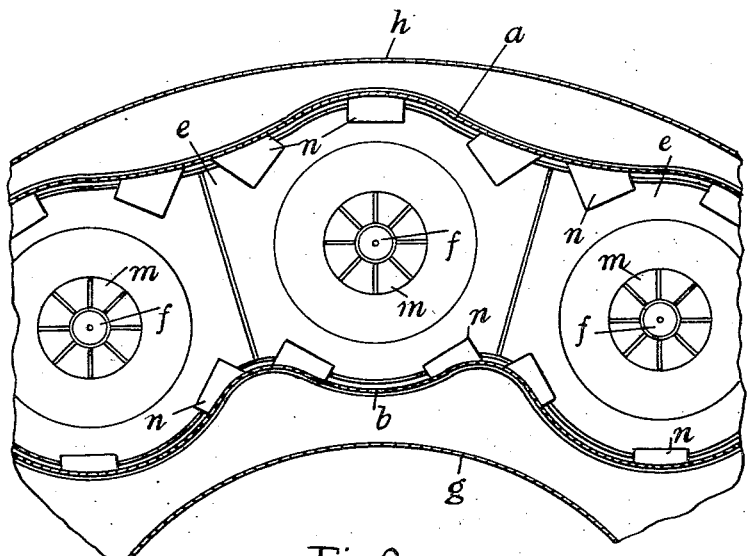

In the accompanying drawings, Figure 1 is a sectional side view illustrating a portion of an annular combustion chamber embodying the invention. Figure 2 is a fragmentary end view.

Referring to the drawings, the inner and outer walls of the combustion chamber are respectively constructed from a series of overlapping sheet metal sections $a$, $b$. The section $c$ of the outer wall immediately adjacent to the entrance end is formed from a sheet which is corrugated transversely. In other words this section when viewed in the direction of its axis presents the appearance of a series of arcuate parts having concave inner surfaces. The corresponding section $d$ of the inner wall is similarly shaped so that when assembled the two walls form inner and outer boundaries of an annular series of laterally intercommunicating adjacent combustion zones in the chamber, the portions of the walls bounding the inner and outer parts of each combustion zone being of concentric curvature. The next and succeeding segments of each wall are also corrugated, and the corrugations of the separate sections gradually diminish in depth so they eventually emerge into a smooth cylindrical section or sections forming the exit end of the chamber as seen in Figure 1.

In the entrance end of the combustion chamber is secured an annular series of separate plates $e$ in each of which is formed a conical or other depression at the centre of each of which is mounted a burner nozzle $f$. The axis of each nozzle coincides with the geometrical centre of the associated combustion zone, so that when the assembly is viewed from the exit end of the combustion chamber, each nozzle appears to be partially surrounded by the adjacent corrugated portions of the inner and outer walls as seen in Figure 2.

Alternatively instead of a series of plates $e$ a single annular plate may be used, this being shaped to provide a series of conical or other depressions each having a nozzle at its centre.

The inner and outer walls of the combustion chamber are surrounded by air jackets, $g$, $h$, these being connected to an annular air inlet $i$, and the air being supplied to the inlet by a blower. Also an air duct $k$ is provided around each nozzle and in each such duct there is provided a swirler $m$ for imparting rotary motion to the air entering the combustion zone around the nozzle.

Further there are formed in the corrugated parts of both the inner and outer walls of the combustion chamber adjacent to the nozzles, a number of air inlet holes or chutes $n$ through which air can enter the chamber from the air jackets. These holes or chutes are arranged adjacent to the troughs of the corrugations so that the air flowing therethrough will set up a circular motion around the fuel jets issuing from the nozzles.

By constructing a combustion chamber in the manner above described, uniform combustion can be obtained in all parts of the chamber. The invention is not, however, restricted to the example above described, as regards the positions of the burner nozzles, as the latter, instead of being mounted on the entrance end of the combustion chamber, may be arranged at a distance from and directed towards the said end.

Having thus described our invention what we claim as new and desire to secure by Letters Patent is:

An annular combustion chamber for a jet-propulsion engine, gas turbine or the like, comprising inner and outer peripheral walls provided with corrugations shaped and arranged to form inner and outer boundaries of an annular series of laterally intercommunicating adjacent combustion zones in the chamber, the portions of the said walls bounding the inner and outer parts of each combustion zone being of concentric curvature, air jackets around the said walls, and an annular series of burner nozzles mounted in spaced relationship in the chamber with their axes respectively coincident with the geometrical centres of the combustion zones so that each of the latter can be supplied with fuel by the corresponding nozzle, the said walls being provided at positions adjacent to the nozzles with air inlets leading from the air jackets to the combustion zones so that air from the jackets can enter the combustion zones and set up therein a circular motion around the axis of each individual burner nozzle.

References Cited in the file of this patent

UNITED STATES PATENTS

| | | |
|---|---|---|
| 2,448,562 | Way et al. | Sept. 7, 1948 |
| 2,477,583 | De Zubay et al. | Aug. 2, 1949 |
| 2,482,095 | Christensen | Sept. 20, 1949 |
| 2,540,991 | Price | Feb. 6, 1951 |
| 2,549,858 | Sforzini | Apr. 24, 1951 |
| 2,560,207 | Berggren et al. | July 10, 1951 |
| 2,610,467 | Miller | Sept. 16, 1952 |
| 2,616,258 | Mock | Nov. 4, 1952 |
| 2,637,975 | Hague | May 12, 1953 |
| 2,646,664 | Meschino | July 28, 1953 |
| 2,647,369 | Leduc | Aug. 4, 1953 |